(12) United States Patent
Townley et al.

(10) Patent No.: US 9,834,951 B1
(45) Date of Patent: Dec. 5, 2017

(54) REMOVABLE VEHICLE ENCLOSURE CABANA FOR PERSONAL OCCUPANCY AND PRIVACY

(71) Applicants: Kenneth Michael Townley, Huntington, NY (US); Lisa Piasio Townley, Huntington, NY (US); Paige Margaret Townley, Huntington, NY (US); John Perry Townley, Huntington, NY (US); Peter Wilson Townley, Huntington, NY (US)

(72) Inventors: Kenneth Michael Townley, Huntington, NY (US); Lisa Piasio Townley, Huntington, NY (US); Paige Margaret Townley, Huntington, NY (US); John Perry Townley, Huntington, NY (US); Peter Wilson Townley, Huntington, NY (US)

( * ) Notice: Subject to any disclaimer, the term of this patent is extended or adjusted under 35 U.S.C. 154(b) by 0 days.

(21) Appl. No.: 15/337,535

(22) Filed: Oct. 28, 2016

(51) Int. Cl.
| | |
|---|---|
| *E04H 15/06* | (2006.01) |
| *B60J 5/10* | (2006.01) |
| *E04H 15/32* | (2006.01) |
| *E04H 15/54* | (2006.01) |
| *E04H 15/58* | (2006.01) |
| *E04H 15/64* | (2006.01) |

(52) U.S. Cl.
CPC .............. *E04H 15/06* (2013.01); *B60J 5/101* (2013.01); *E04H 15/322* (2013.01); *E04H 15/54* (2013.01); *E04H 15/58* (2013.01); *E04H 15/64* (2013.01)

(58) Field of Classification Search
CPC . E04H 15/06; E04H 15/08; B60J 11/00; B60J 3/005; B60J 5/101
USPC ...... 296/159, 163, 165, 161, 152, 160, 1.07, 296/26.11; 135/88.13, 90, 88.05, 902, 135/119, 114, 116; 160/369, 372, 351, 160/88, 377, 127

See application file for complete search history.

(56) References Cited

U.S. PATENT DOCUMENTS

| | | |
|---|---|---|
| 1,640,660 A | 8/1927 | Johnson |
| 1,935,948 A | 11/1933 | Hyrup |
| 2,027,551 A | 1/1936 | Rideout |
| 2,212,326 A | 8/1940 | Piken |
| 2,315,680 A | 4/1943 | Ward |
| 2,770,244 A | 11/1956 | Carson |
| 2,829,661 A | 4/1958 | Crot |

(Continued)

*Primary Examiner* — Glenn Dayoan
*Assistant Examiner* — Sunsurraye Westbrook
(74) *Attorney, Agent, or Firm* — Carter, DeLuca, Farrell & Schmidt, LLP; George Likourezos, Esq.

(57) ABSTRACT

A vehicle enclosure includes a flexible material and at least one movable joining mechanism. The flexible material is supported by a hatchback door of a vehicle when the hatchback door is in an open position. The flexible material defines a movable interface enabling passage into a volume of space defined by the hatchback door and the flexible material. The one or more movable joining mechanisms are configured to removably attach the flexible material to the hatchback door to define a vehicle cabana. The vehicle enclosure is constructed as at least a one-piece configuration. The flexible material may be constructed in at least two sections that are configured to include a vertical portion that extends from a position on the hatchback door of the vehicle when the hatchback door is in an open position and the vertical portion extends towards a surface upon which the vehicle is positioned.

30 Claims, 8 Drawing Sheets

(56) References Cited

U.S. PATENT DOCUMENTS

| | | | |
|---|---|---|---|
| 2,870,774 | A | 1/1959 | Blosser |
| 3,746,386 | A | 7/1973 | Woodward |
| 4,010,973 | A | 3/1977 | Heinrich |
| 4,065,166 | A | 12/1977 | Shoemaker |
| 4,457,553 | A | 7/1984 | Larkin |
| 4,504,049 | A * | 3/1985 | Straub .................. B60P 3/341 135/88.16 |
| 4,652,040 | A | 3/1987 | Mahan |
| 4,729,594 | A * | 3/1988 | Hoff ...................... B60P 3/341 296/161 |
| 5,226,689 | A * | 7/1993 | Roe ....................... B60P 3/34 296/159 |
| 5,417,469 | A | 5/1995 | Hammond |
| 5,738,130 | A * | 4/1998 | Thomas ................ E04H 15/06 135/88.13 |
| 5,820,189 | A * | 10/1998 | Tew ...................... B60P 3/341 296/157 |
| 5,934,726 | A * | 8/1999 | Bossett ................. B60P 3/341 135/88.13 |
| 6,811,207 | B2 | 11/2004 | Dalpizzol et al. |
| 6,871,896 | B1 | 3/2005 | Owen |
| 7,108,005 | B1 | 9/2006 | Christenson et al. |
| 7,464,983 | B1 | 12/2008 | Acosta et al. |
| 8,230,870 | B2 | 7/2012 | Horejsh |
| 8,689,852 | B2 | 4/2014 | Roth et al. |
| 2008/0011435 | A1 | 1/2008 | Wild et al. |
| 2008/0054674 | A1 | 3/2008 | Howie et al. |
| 2009/0056887 | A1 | 3/2009 | Britt |
| 2013/0112355 | A1 | 5/2013 | Roth et al. |

\* cited by examiner

REMOVABLE VEHICLE ENCLOSURE CABANA FOR PERSONAL OCCUPANCY AND PRIVACY

BACKGROUND

1. Technical Field

The present disclosure relates to the field of attaching materials to vehicles to increase the function of vehicles.

2. Description of Related Art

Attachments to vehicles on the driver side or the passenger side are known in the art but are cumbersome to attach and do not provide significant levels of privacy for the user.

SUMMARY

The embodiments of the present disclosure provide significant and unobvious advantages over the foregoing disadvantages of the prior art by providing a vehicle enclosure that can be rapidly attached and rapidly removed from a vehicle and at the same time provides significant room for personal occupancy and is configured to enable personal privacy.

More particularly, the present disclosure relates to a vehicle enclosure that includes a flexible material; and at least one movable joining mechanism. The flexible material is configured to be supported by a hatchback door of a vehicle when the hatchback door is in an open position. The flexible material defines a movable interface enabling passage into a volume of space defined by the hatchback door in the open position and the flexible material. The at least one movable joining mechanism is configured to removably attach the flexible material to the hatchback door.

In embodiments, the hatchback door in the open position and the flexible material defining the volume of space define a vehicle cabana.

In embodiments, the vehicle enclosure is constructed as at least a one-piece configuration.

In embodiments, the flexible material is constructed in at least two sections, wherein the at least two sections are configured to include a vertical portion that extends from a position on the hatchback door of the vehicle when the hatchback door is in an open position and the vertical portion extends towards a surface upon which the vehicle is positioned.

In embodiments, the vehicle defines a front end and a rear end and the rear end includes a right side wall and a left side wall. The rear end includes the hatchback door wherein the hatchback door of the vehicle defines a perimeter that interfaces with the right side wall and the left side wall and the right side wall and the left side wall each define surfaces such that the at least one movable joining mechanism is configured to removably attach the flexible material to at least one of the right side wall and the left side wall.

In embodiments, the vertical portion of at least one of the first section and the second section defines a movable interface between the first section and the second section.

In embodiments, the hatchback door of the vehicle defines a perimeter and the at least one movable joining mechanism is configured to removably attach the flexible material to the perimeter of the hatchback door.

In embodiments, the flexible material is constructed in three sections, wherein the hatchback door defines a perimeter. First and second sections are each configured to include a vertical portion that extends from the perimeter of the hatchback door of the vehicle when the hatchback door is in an open position with the vertical portion extending towards a surface upon which the vehicle is positioned and a third section extends at least partially over a surface defined by the hatchback door when the hatchback door is in an open position.

In embodiments, at least one of the three sections defines a movable interface therebetween.

In embodiments, the flexible material is constructed in four sections, wherein the hatchback door defines a perimeter. First and second sections are each configured to include a vertical portion that extends from the perimeter of the hatchback door of the vehicle when the hatchback door is in an open position with the vertical portion extending towards a surface upon which the vehicle is positioned and third and fourth sections each extend at least partially over the surface defined by the hatchback door at a rear end of the vehicle when the hatchback door is in an open position.

In embodiments, at least two of the four sections define movable interfaces therebetween.

In embodiments, the at least one movable joining mechanism includes a magnetized object. In further embodiments, the magnetized object includes a permanent magnet.

In embodiments, the vehicle enclosure is configured wherein at least one movable joining mechanism includes a first fabric configured to interlock with a second fabric such that the first fabric and the second fabric enable removably attaching the flexible material to the hatchback door.

In embodiments, the flexible material includes at least one channel configured and disposed to direct a fluid towards a surface upon which the vehicle is positioned.

In embodiments, the flexible material includes at least one passage therethrough that enables viewing or accessing to the volume of space or a combination of viewing and accessing to the volume of space.

The present disclosure relates also to a vehicle enclosure that includes a flexible material and at least one movable joining mechanism. The flexible material is configured to be supported by a hatchback door of a vehicle when the hatchback door is in an open position. The flexible material defines a movable interface enabling passage into a volume of space defined by the hatchback door in the open position and the flexible material. The at least one movable joining mechanism is configured to removably attach the flexible material to the hatchback door. The vehicle enclosure is constructed as at least a one-piece configuration and the flexible material includes at least one channel configured and disposed to direct a fluid towards a surface upon which the vehicle is positioned.

In embodiments, the hatchback door in the open position and the flexible material defining the volume of space define a vehicle cabana.

In embodiments, the flexible material is constructed in at least two sections, wherein the at least two sections are configured to include a vertical portion that extends from a position on the hatchback door of the vehicle when the hatchback door is in an open position with the vertical portion extending towards a surface upon which the vehicle is positioned.

In embodiments, the vehicle defines a front end and a rear end and the rear end includes a right side wall and a left side wall. The rear end includes the hatchback door wherein the hatchback door of the vehicle defines a perimeter that interfaces with the right side wall and the left side wall and the right side wall and the left side wall each define surfaces such that the at least one movable joining mechanism is configured to removably attach the flexible material to at least one of the right side wall and the left side wall.

In embodiments, the vertical portion of at least one of the first section and the second section defines a movable interface between the first section and the second section.

In embodiments, wherein the vehicle defines a front end and a rear end, when the hatchback door is in the open position, an interior of the vehicle is exposed to the environs of the vehicle thereby via the rear end of the vehicle. The vehicle enclosure defines a closed position and an open position such that when the vehicle enclosure is in the open position, the interior of the vehicle is exposed to the environs of the vehicle thereby and when the vehicle enclosure is in the closed position, the interior of the vehicle is not exposed to the environs of the vehicle thereby.

BRIEF DESCRIPTION OF THE DRAWINGS

The above-mentioned advantages and other advantages will become more apparent from the following detailed description of the various exemplary embodiments of the present disclosure with reference to the drawings wherein.

DETAILED DESCRIPTION

Figure 1:
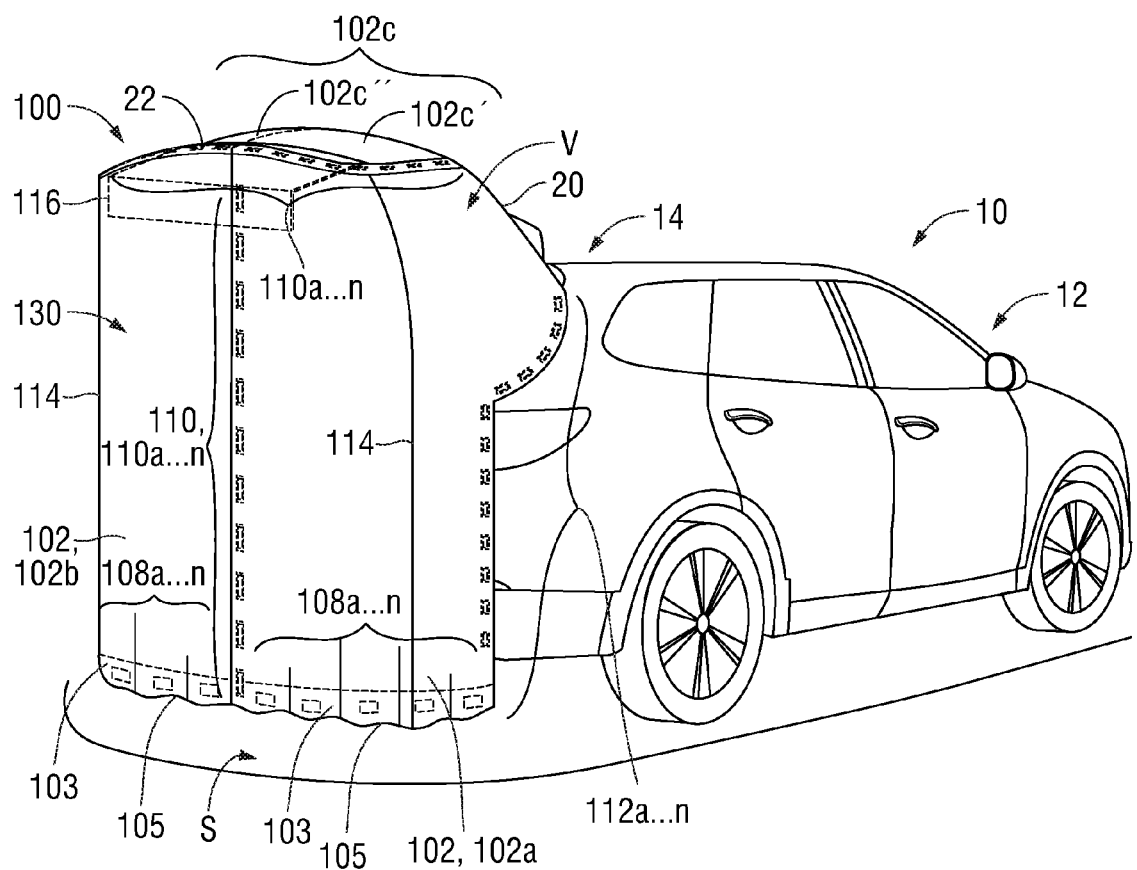
FIG. 1 is a perspective view of a vehicle enclosure according to embodiments of the present disclosure wherein the vehicle enclosure is removably attached to the hatchback door at the rear of a vehicle and wherein the vehicle enclosure is in a fully closed position.

As indicated above, the embodiments of the present disclosure provide significant and unobvious advantages over the foregoing disadvantages of the prior art by providing a vehicle enclosure that includes a flexible material that is configured to be supported by a hatchback door of a vehicle when the hatchback door is in an open or elevated position to define a volume of space such that the hatchback door, the flexible material and the volume of space define a vehicle cabana. The most common function of the vehicle cabana is for personal attire change such as at a beach or a park area, etc. Other functions may include providing a shaded area for a child to rest or to perform a first aid medical procedure etc.

For the purposes of promoting an understanding of the principles of the present disclosure, reference will now be made to the exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

The word "exemplary" may be used herein to mean "serving as an example, instance, or illustration." Any embodiment described herein as "exemplary" is not necessarily to be construed as preferred or advantageous over other embodiments.

It is to be understood that the method steps described herein need not necessarily be performed in the order as described. Further, words such as "thereafter," "then," "next," etc., are not intended to limit the order of the steps. Such words are simply used to guide the reader through the description of the method steps.

Figure 2:
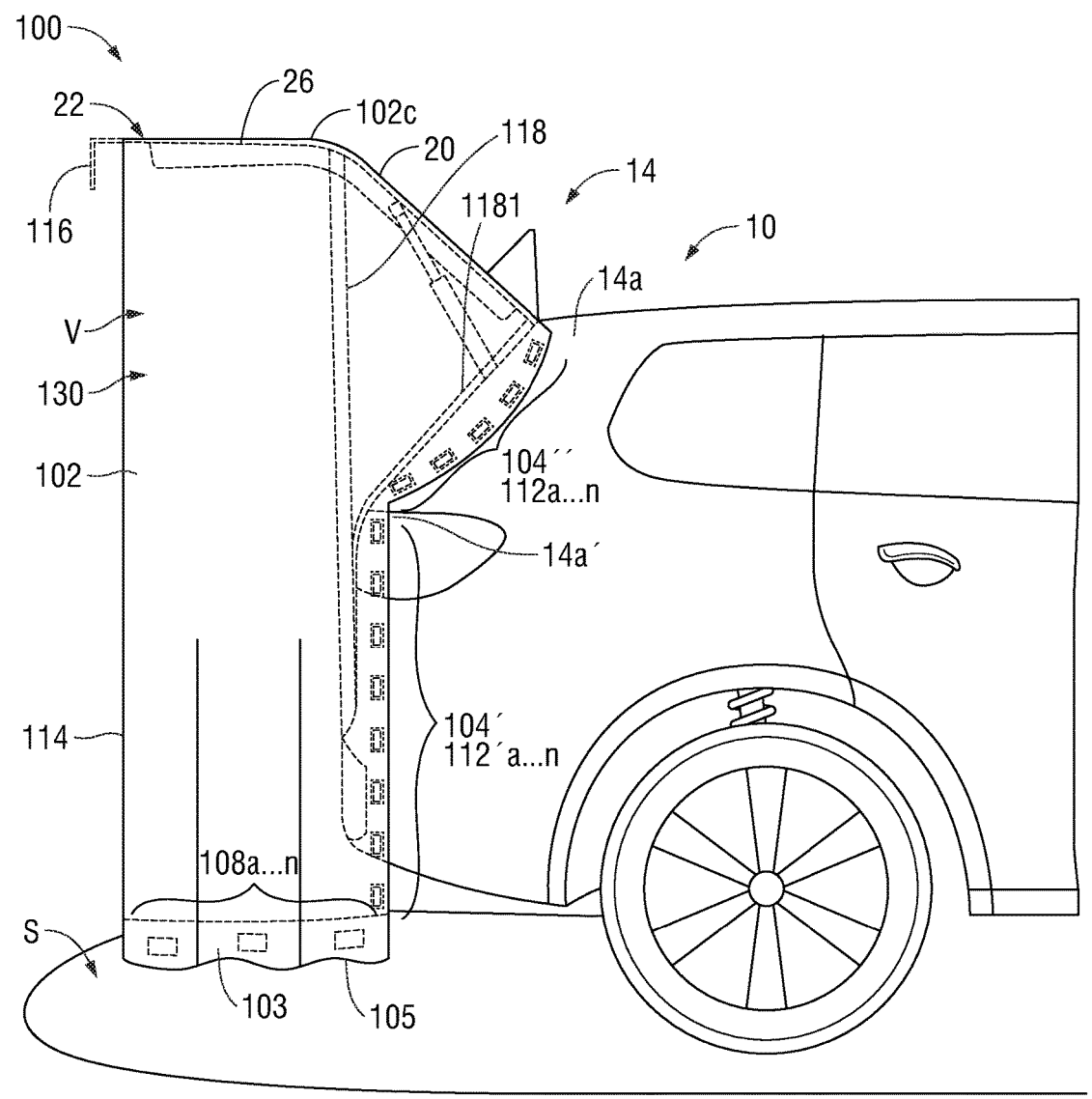
FIG. 2 is an elevation view of the vehicle enclosure of FIG. 1 wherein the movable joining mechanisms removably attach the flexible material to a side wall of the vehicle at the rear end of the vehicle.
Figure 3:
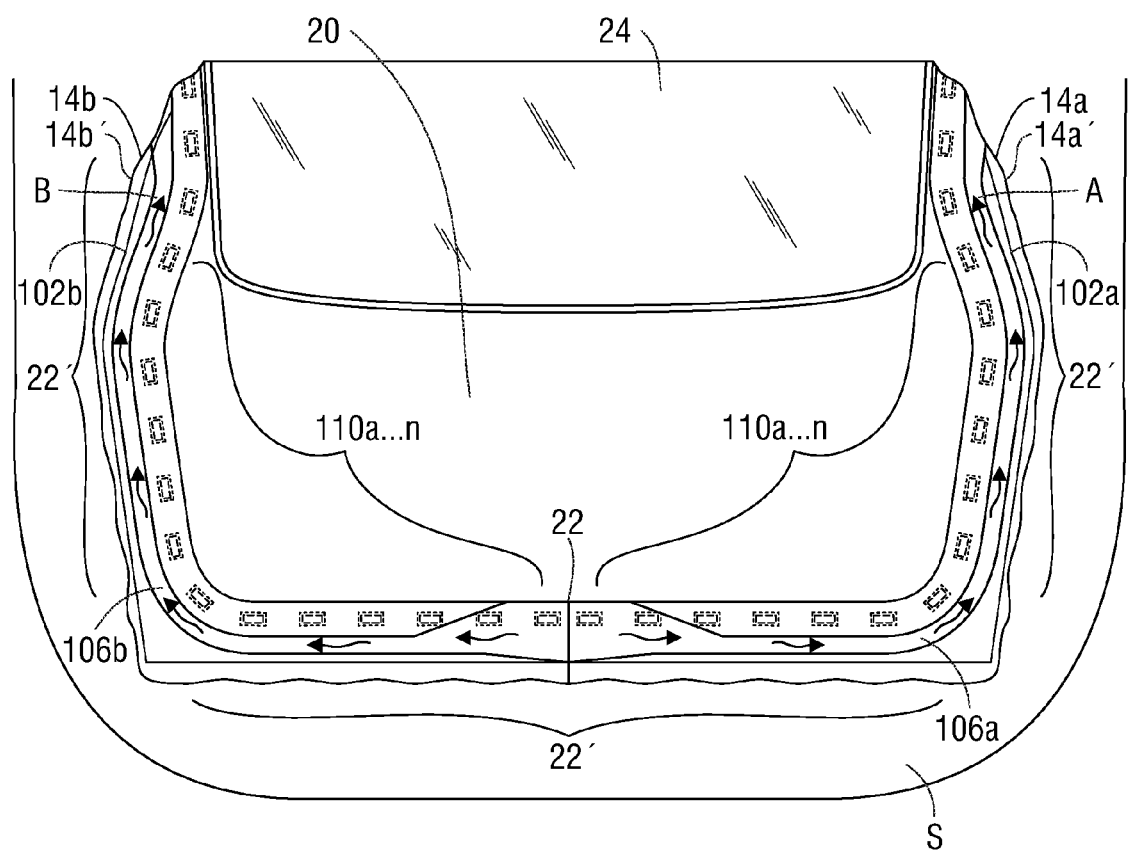
FIG. 3 is a top plan view of the vehicle enclosure of FIG. 1 wherein the movable joining mechanisms removably attach the flexible material to the perimeter of the hatchback door of the vehicle and the flexible material includes channels that are configured and disposed to direct a fluid towards the surface upon which the vehicle is positioned.

Accordingly, referring to FIGS. 1, 2 and 3, the embodiments of the present disclosure relate to a vehicle enclosure 100 that includes a flexible material 102 that is configured to be supported by a hatchback door 20 of a vehicle 10 when the hatchback door 20 is in an open or elevated position as illustrated in FIG. 2.

Returning to FIG. 1, the vehicle enclosure 100 includes at least one movable joining mechanism 110 which in the illustration of FIG. 1 includes a plurality of magnetized objects 110a . . . 110n. The flexible material 102 is constructed in at least two sections 102a and 102b that are configured as vertical portions that extend from a position 22 on the hatchback door 20 that extends toward a surface S upon which the vehicle 10 is positioned. The one or more movable joining mechanisms 110 are configured to removably attach the flexible material 102 to the hatchback door 20.

As best seen in FIG. 1, the vehicle 10 defines a front end 12 and a rear end 14. The rear end 14 includes a right side wall 14a and a left side wall 14b (see FIG. 3). As best seen in FIG. 3, the rear end 14 includes the hatchback door 20 wherein the hatchback door defines a perimeter 22' that interfaces with the right side wall 14a and the left side wall 14b when the hatchback door 20 is in a closed position (not shown).

Returning to FIG. 2, the right side wall 14a defines a surface 14a' and the left side wall 14b (see FIG. 3) defines a surface 14b' such that the one or more movable joining mechanisms 110 are configured to removably attach the flexible material 102 to at least the right side wall 14a or the left side wall 14b or both. That is, in FIGS. 1, 2 and 3, one or more movable joining mechanisms 112a . . . 112n removably attach section 102b of the flexible material 102 to surface 14a' of the right side wall 14a. The attachment of the one or more movable joining mechanisms removably attaching section 102b of the flexible material 102 to surface 14b' of the left side wall 14b is not shown. It is noted that in FIGS. 1 and 2, the section 102a includes one edge 104' that is linear and another edge 104" that is curved so as to adapt to the contours of the rear end 14 of the vehicle 20. Although not shown, the section 102b on the left side wall 14b is similarly configured.

As best seen in FIG. 2, the flexible material 102 forms a volume of space V that is defined by the hatchback door 20 in the open position and the flexible material 102. Thus, the hatchback door 20 in the open or elevated position and the flexible material 102 defining the volume of space V define a vehicle cabana 130. The most common function of the vehicle cabana 130 is for personal attire change such as at a beach or a park area, etc. Other functions may include providing a shaded area for a child to rest or to perform a first aid medical procedure etc.

The vehicle enclosure 100 optionally may include a hem 103 at lower edges 105 of the flexible material 102 that is most proximate to the surface S. The hem 103 may enclose one or more weights 108 a . . . n to urge the lower edges 105 to drop down towards the surface S.

Additionally, and as further described and shown in FIG. 5 below, the vehicle enclosure 100 optionally may include at least one cord or cable 114 or the like that extends or hangs from perimeter 22' of the position 22 of the hatchback door 20 to loop around the hem 103 to enable the hem 103 to be raised from or adjusted with respect to the surface S.

The vehicle enclosure 100 optionally may further include a valance 116 made from the flexible material 102 or other suitable material and which projects laterally from the position 22 of the hatchback door 20 when in the open position and is configured and disposed in a manner so as to protect a user of the vehicle enclosure 100 from the environs, e.g, rain or snow, etc. during use.

Further, as shown in dashed lines in FIG. 2 and as further described below with respect to FIGS. 5 and 6, the vehicle enclosure 100 or the vehicle 10 may optionally include an interior partition or curtain 118 also made from the flexible material 102 or other suitable material. The interior partition 118 is designed to visually separate occupants of the vehicle 10, who are seated in or otherwise positioned inside of the vehicle 10, from the volume of space V when the vehicle enclosure 100 is in use. An alternate routing 118l of the interior partition or curtain 118 is also shown extending along the edges 104' and 104".

FIG. 3 is a top plan view of the vehicle enclosure of FIG. 1 wherein the movable joining mechanisms 110a . . . n removably attach the flexible material 102 as first section 102a and 102b to the perimeter 22' of the hatchback door 20 of the vehicle 10, that includes vehicle rear window 24, and the flexible material 102 as first section 102a may include a channel 106a and second section 102b may include a channel 106b that are configured and disposed to direct a fluid such as, for example, rain water in the direction of arrows A and B, respectively, in channel 106a and 106b towards the surface S upon which the vehicle 10 is positioned. (For clarity, the optional features identified above with respect to FIGS. 1 and 2 are not shown in FIG. 3).

Figure 4:
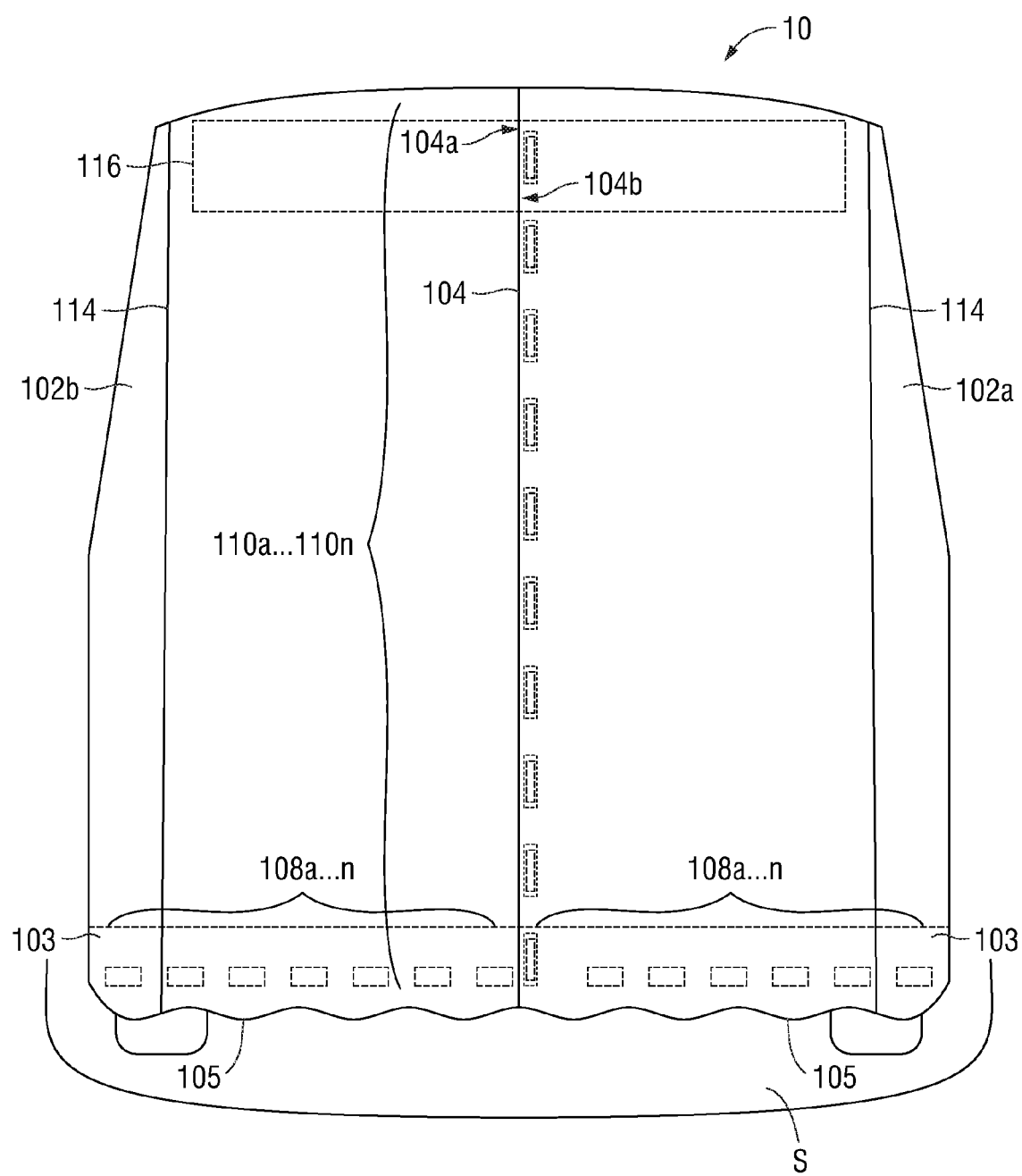
FIG. 4 is an end view of the vehicle enclosure of FIG. 1 wherein the vehicle enclosure is in a fully closed position and wherein the vehicle enclosure includes movable joining mechanisms in the form of magnetized objects.

FIG. 4 is an end view of the vehicle enclosure 100 of FIG. 1 wherein the vehicle enclosure 100 is in a fully closed position and wherein the vehicle enclosure 100 includes movable joining mechanisms 110a . . . 110n in the form of magnetized objects. In embodiments, the magnetized objects 110a . . . 110n may be permanent magnets. A strip of the magnetized objects 110a . . . 110n may be positioned along edge 104a of the first section 102a of the flexible material 102 and overlaps another strip of the magnetized objects 110a . . . 110n positioned along edge 104b of the second section 102b of the flexible material 102. Thus, the first section 102a and the second section 102b define a movable interface 104 between the first section 102a and the second section 102b. Alternatively, the movable joining mechanisms 110a . . . 110n may include other types of fastening devices such as ties, snaps, buttons, zippers, clothespins, hooks, elastics, adhesives, adhesive materials or fabrics such as provided by the commercially available Velcro® (sold by Velcro Limited, Cheshire UK), etc., as several of many examples known to those skilled in the art. The movable joining mechanisms 110a . . . 110n may be configured and utilized to attach the flexible material 102 to either an outside surface of the hatchback door 20 or to an inside surface of the hatchback door 20.

Figure 5:
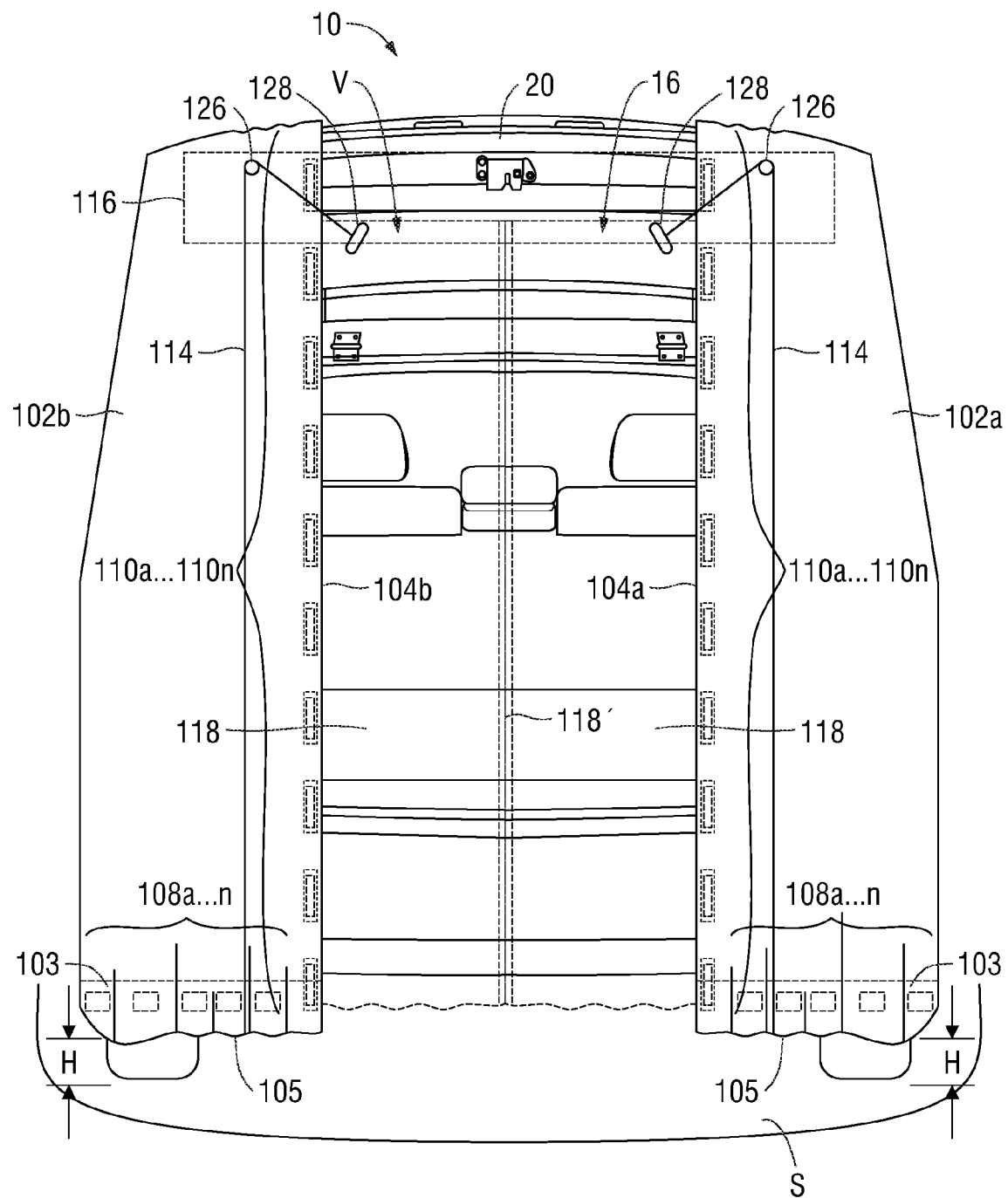
FIG. 5 is an end view of the vehicle enclosure of FIG. 1 wherein the vehicle enclosure is in an open position and wherein the vehicle enclosure includes movable joining mechanisms in the form of magnetized objects.

FIG. 5 is an end view of the vehicle enclosure 100 of FIG. 1 wherein the vehicle enclosure 100 is in an open position and wherein the vehicle enclosure includes movable joining mechanisms again in the form of magnetized objects 110a . . . 110n. With the hatchback door 20 in an open or elevated position, vehicle interior 16 is exposed since the vehicle enclosure 100 is in an open position, thereby exposing the vehicle interior 16 to the environs from the rear of the vehicle.

It should be noted therefore that when the vehicle enclosure 100 is in a fully closed position such as in FIG. 4, the vehicle interior 16 is not exposed to the environs of the vehicle 10 from the rear end of the vehicle.

FIG. 5 further illustrates the optional cord or cable 114 described above with respect to FIGS. 1 and 2. The cords or cables 114 may be positioned on either or both the right side and left side of the vehicle 20 and are supported by pulleys 126 and the height of the lower edge 105 of the flexible material 102 above the surface S adjusted by pulling or releasing the cords or cables 114 via handles 128 attached to the cords or cables 114.

FIG. 5 also further illustrates optional interior partition or curtain 118 (shown in dashed lines) that is in a closed position to visually separate occupants of the vehicle 10, who are seated in or otherwise positioned in vehicle interior 16 inside of the vehicle 10, from the volume of space V when the vehicle enclosure 100 is in use. The interior partition or curtain 118 may include a movably releasable joint 118' to enable separation of the two portions of the partition or curtain. The interior partition or curtain 118 may be attached to the interior surfaces of the flexible material 102 and/or to the hatchback door 20 of the vehicle 10. Thus, the interior partition or curtain 118 may be either pre-attached to the flexible material 102 or attached by a user separately to the vehicle 10 either before or after installation of the vehicle enclosure 100. The removably releasable joint 118' may include fabrics such as provided by the commercially available Velcro® (sold by Velcro Limited, Cheshire UK) or other types of fastening devices 110 such as ties, snaps, buttons, zippers, clothespins, hooks, elastics, adhesives, adhesive materials, etc., as described above, as known to those skilled in the art. The movable joining mechanisms 110a . . . 110n may be configured and utilized to attach the flexible material 102 to either an outside surface of the hatchback door 20 or to an inside surface of the hatchback door 20.

Figure 6:
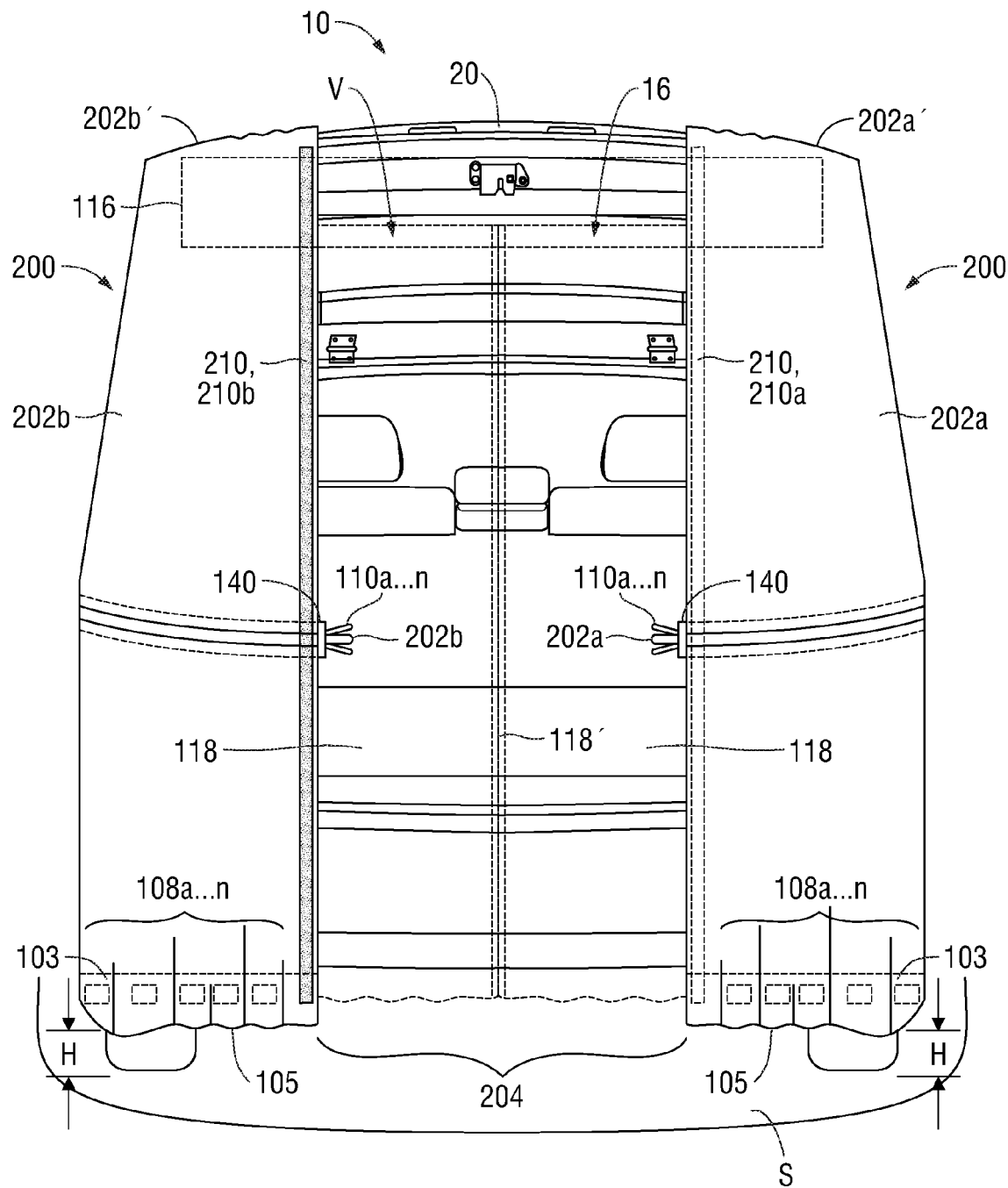
FIG. 6 is an end view of an alternate embodiment of the vehicle enclosure of FIG. 5 wherein the vehicle enclosure is in an open position and wherein the vehicle enclosure includes movable joining mechanisms in the form of a first fabric configured to interlock with a second fabric.

FIG. 6 is an end view of an alternate embodiment of the vehicle enclosure 100 of FIG. 5 wherein the vehicle enclosure 200 is in an open position and wherein the vehicle enclosure includes at least one movable joining mechanism 210 in the form of a first fabric 210a attached to first section 202a that is configured to interlock with a second fabric 210b attached to the second section 202b and thus define a movable interface 204 between the first section 202a and the second section 202b. In embodiments, the first and second fabrics 210a and 201b may include a loop and hook configuration such as provided by the commercially available Velcro® (sold by Velcro Limited, Cheshire UK) as one example.

Although not explicitly shown in FIG. 6, those skilled in the art will recognize that, and understand how, upper portion 202a' of the first section 202a and upper portion 202b' of the second section 202b' may be removably attached to the hatchback door 20 via the movable joining mechanisms 110 in the form of magnetized objects 110a . . . 110n as shown in FIG. 3.

Figure 6A:
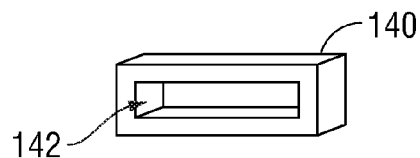
FIG. 6A illustrates a rectangular frame that enables manipulation of flexible material forming the vehicle enclosure of FIG. 6 that enables raising or lowering the lower edges of the flexible material from or towards a surface.

FIG. 6 also illustrates the optional features described above such as the hem 103 with weights 108a . . . 108n, the valance 116 and the interior partition or curtain 118. However, as an alternative means with respect to raising or lowering the lower edge 105 of the flexible material 102 from or towards the surface S as provided by the cords or cables 114 as shown particularly in FIG. 5, the flexible material 202a and 202b of vehicle enclosure 200 may instead be manipulated by a user via rectangular or oval or other suitable shaped frames 140, shown in detail in FIG. 6A, that enable raising or lowering the lower edges 105 from or towards the surface S. The rectangular frames 140 illustrated in FIG. 6 each define an internal aperture 142 through which a user may manually pull portions of the flexible material 202a and 202b therethrough to form a crease that may be locked in position to prevent movement of the flexible material 202a and 202b via the fastening devices 110a . . . 110n such as ties, snaps, buttons, zippers, clothespins, hooks, elastics, adhesives, adhesive materials, etc., as described above, as known to those skilled in the art. In the example shown in FIG. 6, the fastening devices 110a . . . 110n are illustrated via clothespins as an example.

The optional feature of frame 140 may best be deployed when vehicle enclosure 200 includes a section or portion of the flexible material 202a (or 202b) positioned on a side of the vehicle 10, e.g., right side wall 14a (left side wall 14b), is separated from another section or portion of the flexible material 202a (or 202b) positioned at the rear end 14 of the vehicle 20, wherein the section or portion of the flexible material 202a (or 202b) positioned on the right side of the vehicle 10 (or on the left side of the vehicle 10) has frame 140 movably attached and configured and disposed to be moved into position to enable the separated other section or portion of the flexible material 202a (or 202b) to be inserted through the aperture 142 defined by the frame 140.

The movable joining mechanisms 110a . . . 110n may be configured and utilized to attach the flexible material 202a, 202b to either an outside surface of the hatchback door 20 or to an inside surface of the hatchback door 20.

Figure 7:
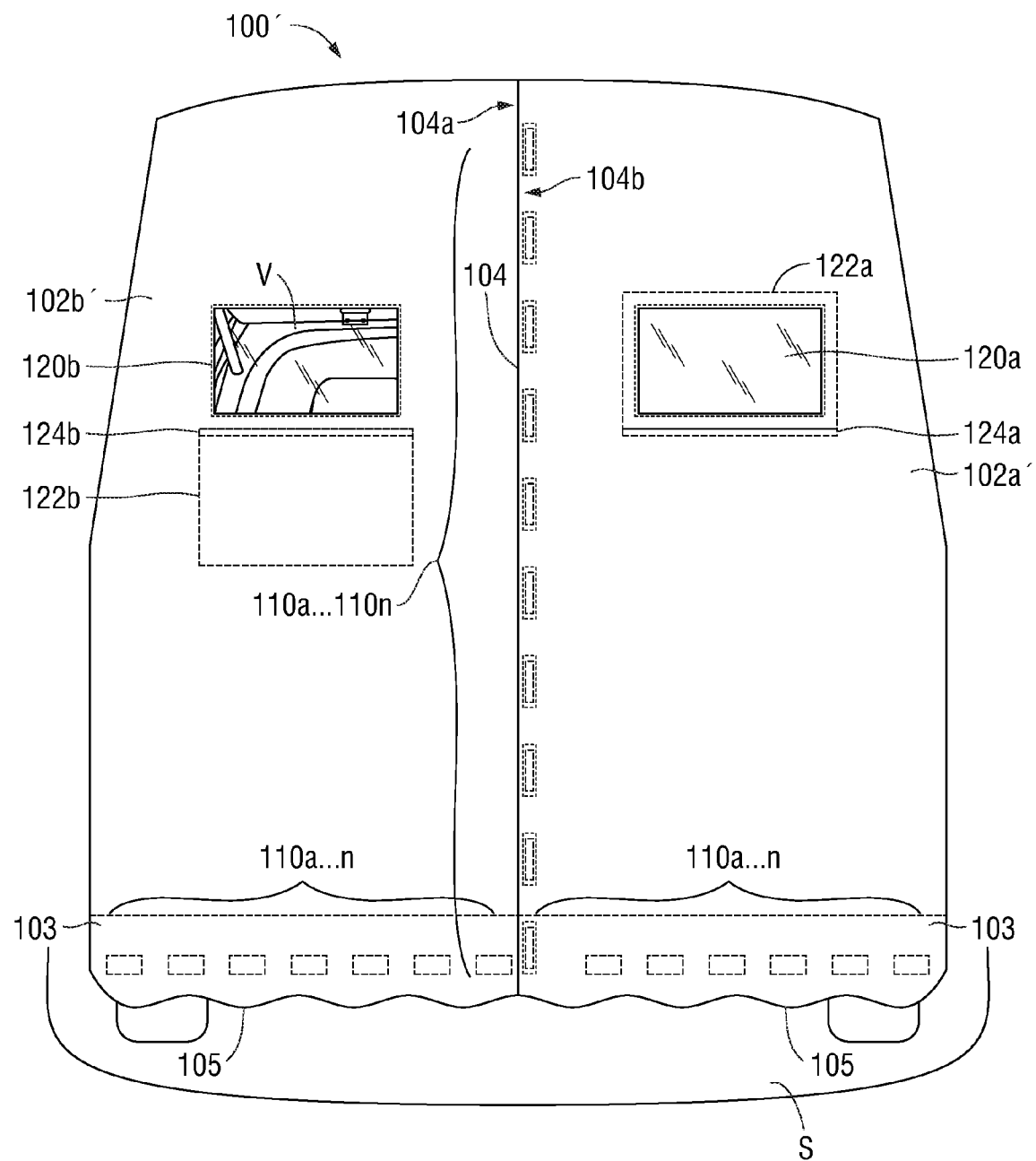
FIG. 7 is a variation of the end view of the vehicle enclosure in a fully closed position as illustrated in FIG. 4 wherein the flexible material includes passages that enable viewing or accessing to a volume of space defined by the hatchback door in the open position and the flexible material.

FIG. 7 is a variation of the end view of the vehicle enclosure 100 wherein vehicle enclosure 100' is in a fully closed position as illustrated in FIG. 4 and wherein flexible material 102a' and 102b' include passage or aperture 120a in flexible material 102a' on the right side of the vehicle 10 and passage or aperture 120b in flexible material 102b' on the left side of vehicle 10. The passages or apertures 120a and 120b enable viewing or accessing to the volume of space V defined by the hatchback door 20 in the open position and the flexible material 102a' and 102b'. The flexible material 102a' on the right side of the vehicle 20 also includes a flap 122a that is maneuvered into position from the internal side of the flexible material 102a via a hinge 124a that is shown in the closed position to prevent viewing or access to the volume of space V through the passage or aperture 120a. Similarly, the flexible material 102b' on the left side of the vehicle 20 also includes a flap 122b that is maneuvered into position from the internal side of the flexible material 102b via a hinge 124b but is shown in the open position to enable viewing or access to the volume of space V through the passage or aperture 120b. Those skilled in the art will recognize that, and understand how, various other mechanisms may be employed to seal the apertures 120a and 120b, such as, for example, by sliding the flaps 122a and 122b into position, etc.

Returning to FIGS. 1 and 2, it can be appreciated that the flexible material 102 may be constructed in three sections. More particularly, first section 102a and second section 102b are configured and disposed as described previously with respect to FIGS. 1, 2 and 3. Additionally, a third section 102c may extend at least partially over a surface 26 that is defined by the hatchback door 20 when the hatchback door 20 is in an open position. The third section 102c may also include the one or more movable joining mechanisms 110 which may interface with the one or more movable joining mechanisms 110a . . . n that are disposed along the upper limit of the first section 102a and the second section 102b.

As illustrated in FIG. 1, the flexible material 102 may also be constructed in four sections. More particularly, third section 102c may be divided into two sub-sections 102c' and 102c" that may be configured and disposed to extend at least partially over the surface 26 of the hatchback door 20. Sub-section 102c' may again include the one or more movable joining mechanisms 110 to interface with the one or more movable joining mechanisms 110a . . . n that are disposed along the upper limit of the first section 102a while sub-section 102c" may interface similarly with the upper limit of the second section 102b.

Figure 8:
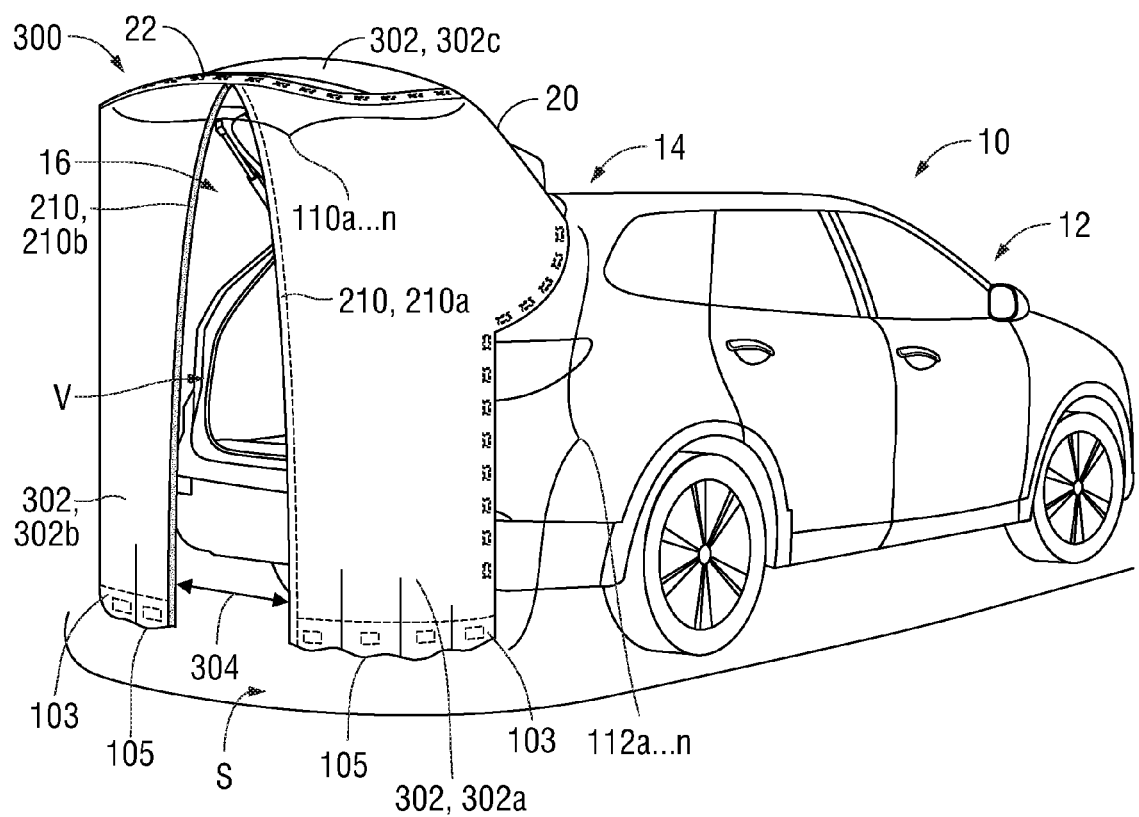
FIG. 8 is an alternate embodiment of the vehicle enclosure of FIG. 1 wherein the flexible material is configured in a one-piece arrangement defining a movable interface between one section of the flexible material and another section of the flexible material.

FIG. 8 is an alternate embodiment of the vehicle enclosure 100 of FIG. 1 wherein now vehicle enclosure 300 is configured of flexible material 302 in a one-piece arrangement that includes first section 302a that is constructed in a similar manner to first section 102a and second section 302b that is constructed in a similar manner to second section 102b. However, in a manner similar to that described above with respect to vehicle enclosure 200 in FIG. 6, vehicle enclosure 300 may now include the at least one movable joining mechanism 210 in the form of a first fabric 210a attached to first section 302a that is configured to interlock with second fabric 210b attached to the second section 302b and thus define a movable interface 304 between the first section 302a and the second section 302b. As compared to vehicle enclosure 200, the first fabric 210a and the second fabric 210b may be disposed orthogonally on the edges of first section 302a and 302b so that the two fabric strips 210a and 210b directly interface with each other to enable a user to readily join them to close to seal the volume of space V from inside the vehicle enclosure 300 and separate them to open to allow the user to readily enter into and exit from the volume of space V. In embodiments, again, the first and second fabrics 210a and 201b may include a loop and hook configuration such as provided by the commercially available Velcro® (sold by Velcro Limited, Cheshire UK) as one example.

The one-piece vehicle enclosure 300 further includes a third section 302c of flexible material 302 that extends over the rear window 24 and the surface 26 defined by the hatchback door 20 when the hatchback door is in an open position. The third section 302c may also include the one or more movable joining mechanisms 110 which may interface with the one or more movable joining mechanisms 110a . . . n that are disposed along the upper limit of the first section 302a and the second section 302b. As a one-piece configuration, vehicle enclosure 300 may provide for simpler installation by the user and packaging for transport and for greater stability in the face of conditions such as the weather, e.g., wind and rain, etc. or simple pulling and tugging by others outside of the vehicle enclosure.

For simplicity, not all of the optional features are illustrated in FIGS. 7 and 8. In addition, the flexible materials 102, 202a, 202b, 302 described and illustrated in the foregoing FIGS. 1-8 may be made from materials employed for other applications such as, for example, gazebos and waterproof curtains. Particular examples include, but are not limited to, canvas, hemp, vinyl or polyvinyl chloride, polyesters, nylon and acrylics.

Those skilled in the art will recognize that, and understand how, there are many ways to join the sections of the vehicle enclosures disclosed herein to accomplish the same function of forming cabana 130. As may be appreciated from the foregoing, the vehicle enclosures described herein provide for rapid assembly and disassembly and a cabana-like volume of space with adequate room for personal occupancy and personal privacy to enable a user or users to utilize the vehicle enclosure as desired for rest and relaxation, change of attire, or to perform other functions such as first aid and the like.

While several embodiments and methodologies of the present disclosure have been described and shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular embodiments and methodologies. Those skilled in the art will envision other modifications within the scope of the claims appended hereto.

What is claimed is:

1. A vehicle enclosure comprising:
   a flexible material; and
   at least one movable joining mechanism,
   the flexible material configured to be supported by a hatchback door of a vehicle when the hatchback door is in an open position, the vehicle defining a rear end, the rear end defining a perimeter of a single opening extending across and vertically along the rear end of the vehicle, the hatchback door defining a perimeter wherein the perimeter of the hatchback door aligns with the perimeter of the single opening extending across and vertically along the rear end of the vehicle such that the single opening is accessible when the hatchback door is in the open position, the flexible material defining a movable interface enabling passage into a volume of space defined by the hatchback door in the open position and the flexible material,
   the at least one movable joining mechanism configured to removably attach the flexible material to the hatchback door,
   wherein the flexible material is configured to include a vertical portion that extends from a position on the hatchback door of the vehicle when the hatchback door is in an open position, the vertical portion extending towards a surface upon which the vehicle is positioned, such that an occupant of the vehicle enclosure can stand on the surface upon which the vehicle is positioned while occupying the volume of space defined by the hatchback door in the open position and the flexible material.

2. The vehicle enclosure according to claim 1, wherein the hatchback door in the open position and the flexible material defining the volume of space define a vehicle cabana.

3. The vehicle enclosure according to claim 1,
   wherein the vehicle defines a front end and a rear end,
   wherein when the hatchback door is in the open position, an interior of the vehicle is exposed to the environs of the vehicle thereby via the rear end of the vehicle, and wherein the vehicle enclosure defines a closed position and an open position such that when the vehicle enclosure is in the open position, the interior of the vehicle is exposed to the environs of the vehicle thereby and wherein when the vehicle enclosure is in the closed position, the interior of the vehicle is not exposed to the environs of the vehicle thereby.

4. The vehicle enclosure according to claim 1, wherein the flexible material is constructed in at least two sections,
   wherein the at least two sections are configured to include the vertical portion that extends from a position on the hatchback door of the vehicle when the hatchback door is in an open position, the vertical portion extending towards a surface upon which the vehicle is positioned.

5. The vehicle enclosure according to claim 4,
   wherein the vehicle defines a front end and a rear end, the rear end including a right side wall and a left side wall,
   the rear end including the hatchback door wherein the hatchback door of the vehicle defines a perimeter that interfaces with the right side wall and the left side wall,
   wherein the right side wall and the left side wall each define surfaces such that the at least one movable joining mechanism is configured to removably attach the flexible material to at least one of the right side wall and the left side wall.

6. The vehicle enclosure according to claim 4, wherein the vertical portion of at least one of the first section and the second section defines a movable interface between the first section and the second section.

7. The vehicle enclosure according to claim 1,
   wherein the hatchback door of the vehicle defines a perimeter, and
   wherein the at least one movable joining mechanism is configured to removably attach the flexible material to the perimeter of the hatchback door.

8. The vehicle enclosure according to claim 4, wherein the flexible material is constructed in three sections,
   wherein the hatchback door defines a perimeter,
   wherein first and second sections are each configured to include:
      a vertical portion that extends from the perimeter of the hatchback door of the vehicle when the hatchback door is in an open position, the vertical portion extending towards a surface upon which the vehicle is positioned; and
   wherein a third section extends at least partially over a surface defined by the hatchback door when the hatchback door is in an open position.

9. The vehicle enclosure according to claim 8, wherein at least one of the three sections defines a movable interface therebetween.

10. The vehicle enclosure according to claim 1, wherein the flexible material is constructed in four sections, wherein the hatchback door defines a perimeter,
    wherein first and second sections are each configured to include:

a vertical portion that extends from the perimeter of the hatchback door of the vehicle when the hatchback door is in an open position, the vertical portion extending towards a surface upon which the vehicle is positioned; and wherein third and fourth sections each extend at least partially over the surface defined by the hatchback door at a rear end of the vehicle when the hatchback door is in an open position.

11. The vehicle enclosure according to claim 10, wherein at least two of the four sections define movable interfaces therebetween.

12. The vehicle enclosure according to claim 1, wherein the at least one movable joining mechanism includes a magnetized object.

13. The vehicle enclosure according to claim 12, wherein the magnetized object includes a permanent magnet.

14. The vehicle enclosure according to claim 1, wherein the vehicle enclosure is configured wherein at least one movable joining mechanism includes a first fabric configured to interlock with a second fabric such that the first fabric and the second fabric enable removably attaching the flexible material to the hatchback door.

15. The vehicle enclosure according to claim 1, wherein the flexible material includes at least one channel configured and disposed to direct a fluid towards a surface upon which the vehicle is positioned.

16. The vehicle enclosure according to claim 1, wherein the flexible material includes at least one passage therethrough that enables viewing or accessing to the volume of space or a combination of viewing and accessing to the volume of space.

17. The vehicle enclosure according to claim 1, wherein the flexible material defines a lower edge most proximate to the surface, the flexible material including a hem disposed along the lower edge, the hem enclosing at least one weighted object therein to urge the lower edge towards a surface upon which the vehicle is positioned.

18. The vehicle enclosure according to claim 17, wherein the flexible material includes a cord configured and disposed to loop around the lower edge to enable the hem to be raised above and lowered towards the surface upon which the vehicle is positioned to define a height of the lower edge above the surface upon which the vehicle is positioned.

19. The vehicle enclosure according to claim 18, wherein the flexible material includes:
 a pulley supporting the cord; and
 a handle attached to the cord to enable the cord to raise and lower the lower edge of the flexible material to and from the surface upon which the vehicle is positioned.

20. The vehicle enclosure according to claim 1, further comprising a portion of the flexible material positioned on a side of the vehicle that is separated from another portion of the flexible material positioned at a rear end of the vehicle,
 wherein the portion of the flexible material positioned on the side of the vehicle has a frame movably attached and configured and disposed to be moved into position to enable the separated other portion of the flexible material to be inserted through an aperture defined by the frame.

21. A vehicle enclosure comprising:
 a flexible material; and
 at least one movable joining mechanism,
 the flexible material configured to be supported by a hatchback door of a vehicle when the hatchback door is in an open position, the flexible material defining a movable interface enabling passage into a volume of space defined by the hatchback door in the open position and the flexible material,
 the at least one movable joining mechanism configured to removably attach the flexible material to the hatchback door,
 wherein the vehicle enclosure is constructed as at least a one-piece configuration, and
 wherein the flexible material includes at least one channel configured and disposed to direct a fluid towards a surface upon which the vehicle is positioned.

22. The vehicle enclosure according to claim 21, wherein the hatchback door in the open position and the flexible material defining the volume of space define a vehicle cabana.

23. The vehicle enclosure according to claim 21,
 wherein the vehicle defines a front end and a rear end,
 wherein when the hatchback door is in the open position, an interior of the vehicle is exposed to the environs of the vehicle thereby via the rear end of the vehicle, and wherein the vehicle enclosure defines a closed position and an open position such that when the vehicle enclosure is in the open position, the interior of the vehicle is exposed to the environs of the vehicle thereby and wherein when the vehicle enclosure is in the closed position, the interior of the vehicle is not exposed to the environs of the vehicle thereby.

24. The vehicle enclosure according to claim 21, wherein the flexible material is constructed in at least two sections,
 wherein the at least two sections are configured to include a vertical portion that extends from a position on the hatchback door of the vehicle when the hatchback door is in an open position, the vertical portion extending towards a surface upon which the vehicle is positioned.

25. The vehicle enclosure according to claim 24,
 wherein the vehicle defines a front end and a rear end, the rear end including a right side wall and a left side wall,
 the rear end including the hatchback door wherein the hatchback door of the vehicle defines a perimeter that interfaces with the right side wall and the left side wall,
 wherein the right side wall and the left side wall each define surfaces such that the at least one movable joining mechanism is configured to removably attach the flexible material to at least one of the right side wall and the left side wall.

26. The vehicle enclosure according to claim 24, wherein the vertical portion of at least one of the first section and the second section defines a movable interface between the first section and the second section.

27. The vehicle enclosure according to claim 21, wherein the flexible material defines a lower edge most proximate to the surface, the flexible material including a hem disposed along the lower edge, the hem enclosing at least one weighted object therein to urge the lower edge towards a surface upon which the vehicle is positioned.

28. The vehicle enclosure according to claim 27, wherein the flexible material includes a cord configured and disposed to loop around the lower edge to enable the hem to be raised above and lowered towards the surface upon which the vehicle is positioned to define a height of the lower edge above the surface upon which the vehicle is positioned.

29. The vehicle enclosure according to claim 28, wherein the flexible material includes:
 a pulley supporting the cord; and
 a handle attached to the cord to enable the cord to raise and lower the lower edge of the flexible material to and from the surface upon which the vehicle is positioned.

30. The vehicle enclosure according to claim 21, further comprising a portion of the flexible material positioned on a side of the vehicle that is separated from another portion of the flexible material positioned at a rear end of the vehicle, wherein the portion of the flexible material positioned on the side of the vehicle has a frame movably attached and configured and disposed to be moved into position to enable the separated another portion of the flexible material to be inserted through an aperture defined by the frame.

* * * * *